US009098337B2

(12) United States Patent
Dong et al.

(10) Patent No.: US 9,098,337 B2
(45) Date of Patent: Aug. 4, 2015

(54) SCHEDULING VIRTUAL CENTRAL PROCESSING UNITS OF VIRTUAL MACHINES AMONG PHYSICAL PROCESSING UNITS

(71) Applicant: Intel Corporation, Santa Clara, CA (US)

(72) Inventors: Yao Zu Dong, Shanghai (CN); Kun Tian, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/675,669

(22) Filed: Nov. 13, 2012

(65) Prior Publication Data

US 2013/0167146 A1 Jun. 27, 2013

(30) Foreign Application Priority Data

Dec. 26, 2011 (WO) ................ PCT/CN2011/084626

(51) Int. Cl.
*G06F 9/455* (2006.01)
*G06F 9/46* (2006.01)
*G06F 9/50* (2006.01)

(52) U.S. Cl.
CPC .......... *G06F 9/5033* (2013.01); *G06F 9/45558* (2013.01); *G06F 2009/45562* (2013.01)

(58) Field of Classification Search
CPC .................... G06F 9/5033; G06F 2009/45562; G06F 9/45558
See application file for complete search history.

(56) References Cited

U.S. PATENT DOCUMENTS

| 2007/0271563 | A1* | 11/2007 | Anand et al. ................... 718/100 |
| 2009/0077550 | A1* | 3/2009 | Rhine ............................. 718/1 |
| 2009/0241112 | A1 | 9/2009 | Shimogawa |
| 2011/0093861 | A1* | 4/2011 | Flemming et al. ............ 718/104 |
| 2011/0179162 | A1* | 7/2011 | Mayo et al. .................... 709/224 |
| 2012/0030677 | A1* | 2/2012 | Panesar et al. .................... 718/1 |
| 2012/0210043 | A1* | 8/2012 | Joshi et al. ........................ 711/6 |

(Continued)

FOREIGN PATENT DOCUMENTS

| CN | 101169731 | 4/2008 |
| CN | 101183315 | 5/2008 |

OTHER PUBLICATIONS

International Search Report and Written Opinion mailed Sep. 20, 2012 for PCT Application No. PCT/CN2011/084626, 11 pages.

(Continued)

*Primary Examiner* — Abdullah Al Kawsar
*Assistant Examiner* — James J Lee
(74) *Attorney, Agent, or Firm* — Schwabe, Williamson & Wyatt, P.C.

(57) ABSTRACT

Embodiments of apparatus, computer-implemented methods, systems, and computer-readable media are described herein for a virtual machine monitor. The virtual machine monitor may be configured to determine whether to schedule a virtual central processing unit of one of a plurality of virtual machines on a first physical processing unit of a plurality of physical processing units. Each virtual machine may have one or more virtual central processing units. The determination may be based at least in part on whether a context of the virtual central processing unit suggests a desired cache hit rate on one or more cache units of the apparatus by the first physical processing unit when operating the virtual central processing unit.

25 Claims, 4 Drawing Sheets

(56) References Cited

U.S. PATENT DOCUMENTS

2012/0226866 A1* 9/2012 Bozek et al. .................. 711/122
2012/0254860 A1* 10/2012 Bozek et al. ..................... 718/1

OTHER PUBLICATIONS

International Preliminary Report on Patentability mailed Jul. 10, 2014 for International Application No. PCT/CN2011/084626, 7 pages.

* cited by examiner

SCHEDULING VIRTUAL CENTRAL PROCESSING UNITS OF VIRTUAL MACHINES AMONG PHYSICAL PROCESSING UNITS

RELATED APPLICATIONS

The present application claims priority under 35 U.S.C. §§119 and 365(a) to International Application No. PCT/CN2011/084626, filed Dec. 26, 2011, entitled "SCHEDULING VIRTUAL CENTRAL PROCESSING UNITS OF VIRTUAL MACHINES AMONG", which designated the United States of America and at least one country other than the United States. The entire contents and disclosure of International Application No. PCT/CN2011/084626 is hereby incorporated by reference in its entirety.

FIELD

Embodiments of the present invention relate generally to the technical field of data processing, and more particularly, to scheduling virtual central processing units of virtual machines among physical processing units.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Existing virtual machine monitors (sometimes referred to as "hypervisors") may schedule virtual central processing units of virtual machines among multiple physical processing units (e.g., processors, processor cores, logical processors executed by hyper-threading processors, hosts in a cloud computer system), and instantiate the virtual machines thereon.

Today, virtual machine monitors tend to use empirical heuristics on a coarse level to schedule virtual central processing units among multiple physical processing units. These coarse heuristic techniques often have minimal impact in the majority of workloads, or performance gain in some specific scenarios.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
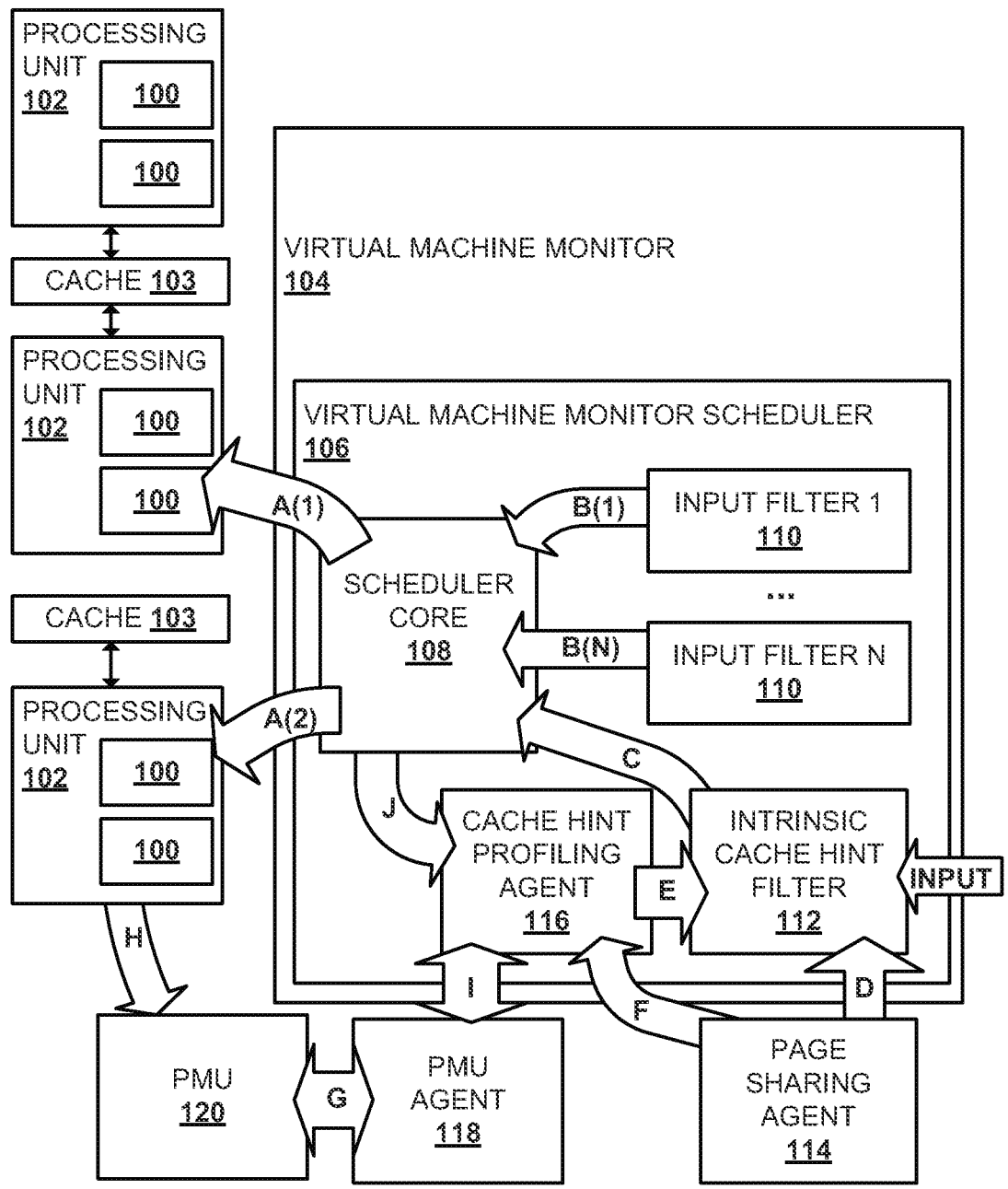
FIG. 1 schematically illustrates an example of how components associated with a virtual machine monitor may interact to schedule virtual central processing units of virtual machines among a plurality of physical processing units, in accordance with various embodiments.

Embodiments of apparatus, computer-implemented methods, systems, and computer-readable media are described herein for a virtual machine monitor. The virtual machine monitor may be configured to determine whether to schedule a virtual central processing unit of one of a plurality of virtual machines on a first physical processing unit of a plurality of physical processing units. Each virtual machine may have one or more virtual central processing units. The determination may be based at least in part on whether a context of the virtual central processing unit suggests a desired cache hit rate on one or more cache units of the apparatus by the first physical processing unit when operating the virtual central processing unit.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

As used herein, "cache hit rate" may refer to a ratio of cache hits to a sum of cache hits and cache misses (e.g., cache hits/(cache misses+cache hits)).

As used herein, a "physical processing unit," or "processing unit" unmodified by "virtual," may refer to any apparatus with cache memory that is configured to execute instructions, such as a single processor (a processor may also be referred to as a central processing unit, or "CPU"), multiple processors acting in cooperation, one or more processor cores, one or more logical processors executed by a hyper-threading physical processor, one or more hosts of a cloud computer system acting in cooperation, and so forth.

FIG. 1 depicts schematically example components that may be implemented to schedule virtual central processing units 100 of virtual machines (not shown) among a plurality of physical processing units 102, in accordance with various embodiments. Each physical processing unit 102 may have an associated cache unit 103. In various embodiments, multiple processors or cores that share a cache unit 103, such as the top two physical processing units 102, may be referred to as "siblings." In various embodiments, virtual machines and/or virtual central processing units of virtual machines may be scheduled on separate siblings without sacrificing a desired cache hit rate.

A virtual machine monitor 104 may include a virtual machine monitor scheduler 106. In some embodiments, virtual machine monitor scheduler 106 may be a separate module in communication with virtual machine monitor 104. Virtual machine monitor scheduler 106 may include a scheduler core 108 that may receive data from various sources and, based on this received data, schedule virtual central processing units 100 among the plurality of physical processing units 102, as shown at arrows A(1) and A(2), in order to achieve a desired cache hit rate of the cache units 103 by the physical processing units 102. Each of these components may be implemented using software, hardware and/or a combination of the two.

One or more miscellaneous input filters 110 may provide various data to scheduler core 108, e.g., as indicated by arrows B(1)-B(N) in FIG. 1. One example may be a time-based sampler filter. Such a filter may track consumed computing cycles of virtual central processing units 100 operated by one or more physical processing units 102.

In various embodiments, an intrinsic cache hint filter 112 may be configured to receive and/or obtain information about contexts of one or more virtual central processing units (or more generally, virtual machines). A virtual central processing unit context may include various information about a virtual central processing unit, such as a template (e.g., Linux, Windows®) from which a virtual machine—of which the virtual central processing unit is part—was initiated, memory pages accessed by a physical processing unit 102 when operating the virtual central processing unit or other virtual central processing units of the same (or different) virtual machine, and so forth. Context similarity between virtual central processing units operating on the same physical processing unit may affect performance of the physical processing unit. Generally, the higher the context similarity between virtual central processing units operated by a physical processing unit, the higher cache hit rate on the cache unit may be experienced, and hence, improved overall performance may be achieved for the physical processing unit.

Intrinsic cache hint filter 112 may provide virtual central processing unit context information, which may be referred to as "cache hints," to scheduler core 108, e.g., as indicated by arrow C. In various embodiments, virtual machine monitor 104 and/or scheduler core 108 may schedule and/or alter scheduling of virtual central processing units 100 among a plurality of physical processing units 102, as well as instantiate the virtual machines thereon, based at least in part on the received cache hints.

Intrinsic cache hint filter 112 may receive and/or obtain virtual central processing unit context information from various sources. For example, intrinsic cache hint filter 112 may receive, from a page sharing agent 114, e.g., at arrow D, information about memory pages that may be shared or potentially shared among multiple virtual central processing units 100. Page sharing agent 114 may be configured to compile page sharing statistics of one or more virtual central processing units 100. Virtual machine monitor 104 and/or scheduler core 108 may be configured to schedule and/or alter scheduling of virtual central processing units 100 among a plurality of physical processing units 102 based at least in part on the page sharing statistics compiled by page sharing agent 114. In the embodiment of FIG. 1, page sharing agent 114 is separate from but operably coupled with virtual machine monitor 104, but in other embodiments, page sharing agent may be implemented as part of virtual machine monitor 104 and/or virtual machine monitor scheduler 106.

In various embodiments, page sharing statistics compiled by page sharing agent 114 may include a page sharing ratio of two or more virtual central processing units or their respective virtual machines. For example, a physical processing unit operating a virtual central processing unit of virtual machine A may access 90% of the same memory pages as when it operates a virtual central processing unit of virtual machine B. Thus, a page sharing ratio between virtual machine A and virtual machine B may be 90%. Such a high percentage may suggest a desired cache hit rate if virtual central processing units of virtual machine A and virtual machine B are scheduled on the same physical processing unit, due to the cache contents loaded by the virtual central processing unit of virtual machine A at execution time being reusable by the virtual central processing unit of virtual machine B.

In various embodiments, intrinsic cache hint filter 112 may receive information from user input. For example, an administrator of a web hosting business may know which virtual machines are provisioned from the same template or which virtual machines are likely to share the most memory pages. That administrator may use a user interface to specify cache hints directly to intrinsic cache hint filter 112.

A cache hint profiling agent 116 may be configured to measure cache hit rates of physical processing units 102, periodically or in response to various events, utilizing various profiling techniques. Cache hint profiling agent 116 may provide these results to intrinsic cache hint filter 112, e.g., at arrow E. Intrinsic cache hint filter 112 may in turn provide the cache hit rate measurement results and/or cache hints based on those results to scheduler core 108, e.g., at arrow C. Scheduler core 108 and/or virtual machine monitor 104 may schedule and/or alter scheduling of virtual central processing units 100 among the plurality of physical processing units 102 based at least in part on cache hit rate of the physical processing units 102 as measured by cache hint profiling agent 116.

As an example of how cache hint profiling agent 116 may measure cache hit rate, page sharing agent 114 may provide page sharing statistics or other page sharing information, e.g., at arrow F, to cache hint profiling agent 116. Cache hint profiling agent 116 may in turn provide this information or cache hints based thereon to intrinsic cache hint filter 112 at arrow E. Using this information, alone or with other information, intrinsic cache hint filter 112 may generate cache hints to send to virtual machine monitor 104 and/or scheduler core 108. Scheduler core 108 and/or virtual machine monitor 104 may use these cache hints to schedule and/or alter scheduling of virtual central processing units 100 among a plurality of physical processing units 102.

As another example of how cache hint profiling agent 116 may measure cache hit rate, a performance monitoring unit agent 118 (designated "PMU Agent" in FIG. 1) may be configured to exchange information with a performance monitoring unit 120, e.g., at arrow G, and provide this information to cache hint profiling agent 116, e.g., at arrow I in FIG. 1. Performance monitoring unit 120 may be configured to gather statistics on the operation of one or more physical processing units and/or associated memory, e.g., at arrow H. Virtual machine monitor 104 and/or scheduler core 108 may schedule and/or alter scheduling of virtual central processing units 100 among a plurality of physical processing units 102 based on information provided by performance monitoring unit agent 118. While a single performance monitoring unit 120 is shown in FIG. 1, it should be understood that any number of performance monitoring units, such as one performance monitoring unit per physical processing unit 102, may be included.

Operation of performance monitoring unit 120 and/or performance monitoring unit agent 118 may require computing resources. Accordingly, in various embodiments, cache hint profiling agent 116 and/or other components may be configured to selectively activate and/or deactivate performance monitoring unit agent 118 and/or a performance monitoring unit 120, e.g., at arrow I. In various embodiments, scheduler core 108 may use data sampled by performance monitoring unit 120 during a selected time interval as representative of longer intervals of time, to guide its scheduling decision-making. In some embodiments, scheduler core 108 or another component may request cache hint profiling agent 116 to activate/deactivate performance monitoring unit agent 118, e.g., at arrow J.

Performance monitoring unit 120 and/or performance monitoring unit agent 118 may be activated and/or deactivated based on a variety of factors. For example, in various embodiments, performance monitoring unit agent 118 may be activated, e.g., by scheduler core 108 or cache hint profiling agent 116, where, during a predetermined time interval, a count of acts of scheduling of virtual central processing units of virtual machines by virtual machine monitor 104 and/or scheduler core 108 exceeds a predetermined threshold (e.g., 100). In such a scenario, performance monitoring unit 120 and/or performance monitoring unit agent 118 may be activated to sample data from one or more physical processing units during one or more of those acts of scheduling. Likewise, in various embodiments, a performance monitoring unit or performance monitoring unit agent 118 may be deactivated, e.g., by scheduler core 108 or cache hint profiling agent 116, where a count of acts of scheduling by virtual machine monitor 104 and/or scheduler core 108 during a predetermined time interval falls below the predetermined threshold.

Additionally or alternatively, virtual machine monitor 104 and/or scheduler core 108 may periodically activate the performance monitoring unit 120 and/or performance monitoring unit agent 118 at predetermined time intervals.

In various embodiments, a performance monitoring unit or performance monitoring unit agent 118 may be activated, e.g., by virtual machine monitor 104, scheduler core 108 and/or cache hint profiling agent 116, for a particular physical processing unit. For example, assume two physical processing units: CPU_0 and CPU_1. Virtual machine monitor 104, scheduler core 108 and/or cache hint profiling agent 116 may activate a performance monitoring unit that is associated with CPU_0, but disable a performance monitoring unit that is associated with CPU_1.

In some embodiments, where performance monitoring unit agent 118 and/or performance monitoring unit 120 is initiated contemporaneously with a particular virtual central processing unit of a virtual machine, when that virtual central processing unit is to be scheduled out, virtual machine monitor 104 and/or scheduler core 108 may deactivate the performance monitoring unit or performance monitoring unit agent 118. In such embodiments, cache hint profiling agent 116 may calculate a cache hit rate $CacheHitRate_{current}$ during operation of the virtual central processing unit to be scheduled out and utilize it to calculate a new context similarity $ContextSimilarity_{new}$ to be considered by scheduler core 108 when scheduling the next virtual central processing units. For example, cache hint profiling agent 116 may utilize a decaying algorithm such as the following to calculate $ContextSimilarity_{new}$:

$$ContextSimilarity_{new} = CacheHitRate_{current} \times 10\% + ContextSimilarity_{previous} \times 80\%$$

While specific percentages are used herein, it should be understood that other higher or lower percentages may be used. Context similarities such as $ContextSimilarity_{new}$ and $ContextSimilarity_{previous}$ may be calculated in various ways. In embodiments without a page sharing agent, a performance monitoring unit may be used to measure cache hits or misses for calculation of a cache hit rate. A context similarity may be a function of the calculated cache hit rate (e.g., $ContextSimilarity=f(CacheHitRate)$). In embodiments with a page sharing agent, context similarity may be based on page sharing statistics provided by the page sharing agent.

Cache hints may include various information. In some embodiments, particularly where a page sharing agent provides page sharing statistics, cache hints may include relatively simple information about the virtual machines of the virtual central processing units to be scheduled, as shown in the following example:

| GROUP ID {MEMBERS} | CONTEXT SIMILARITY |
| --- | --- |
| GROUP_1 {VM1, VM2, VM3} | 90% |
| GROUP_2 {VM4, VM5, VM6} | 90% |

In various embodiments, cache hints like this may be based on page statistics provided by a page sharing agent. Virtual machine monitor 104 and/or scheduler core 108 may schedule virtual central processing units of virtual machines of a group on the same physical processing unit. For example, virtual central processing units of virtual machines of GROUP_1 may be scheduled on a first physical processing unit and virtual central processing units of virtual machines of GROUP_2 may be scheduled on a second physical processing unit. This may increase cache hit rate because the virtual central processing units may be likely to utilize many of the same code paths and/or memory pages. In embodiments with sibling physical processing units, or physical processing units that share cache, each sibling may operate a virtual central processing unit of virtual machines from the same group to reuse the cache from execution of other virtual central processing units of the other virtual machines of the group.

It should be understood that virtual machine monitor 104 and/or scheduler core 108 may consider other factors besides group membership in selectively scheduling virtual central processing units among physical processing units, such as the virtual machine monitor's scheduling policy. Other factors may include but are not limited to priority, credit (in embodiments using a credit scheduler), and so forth.

Figure 2:
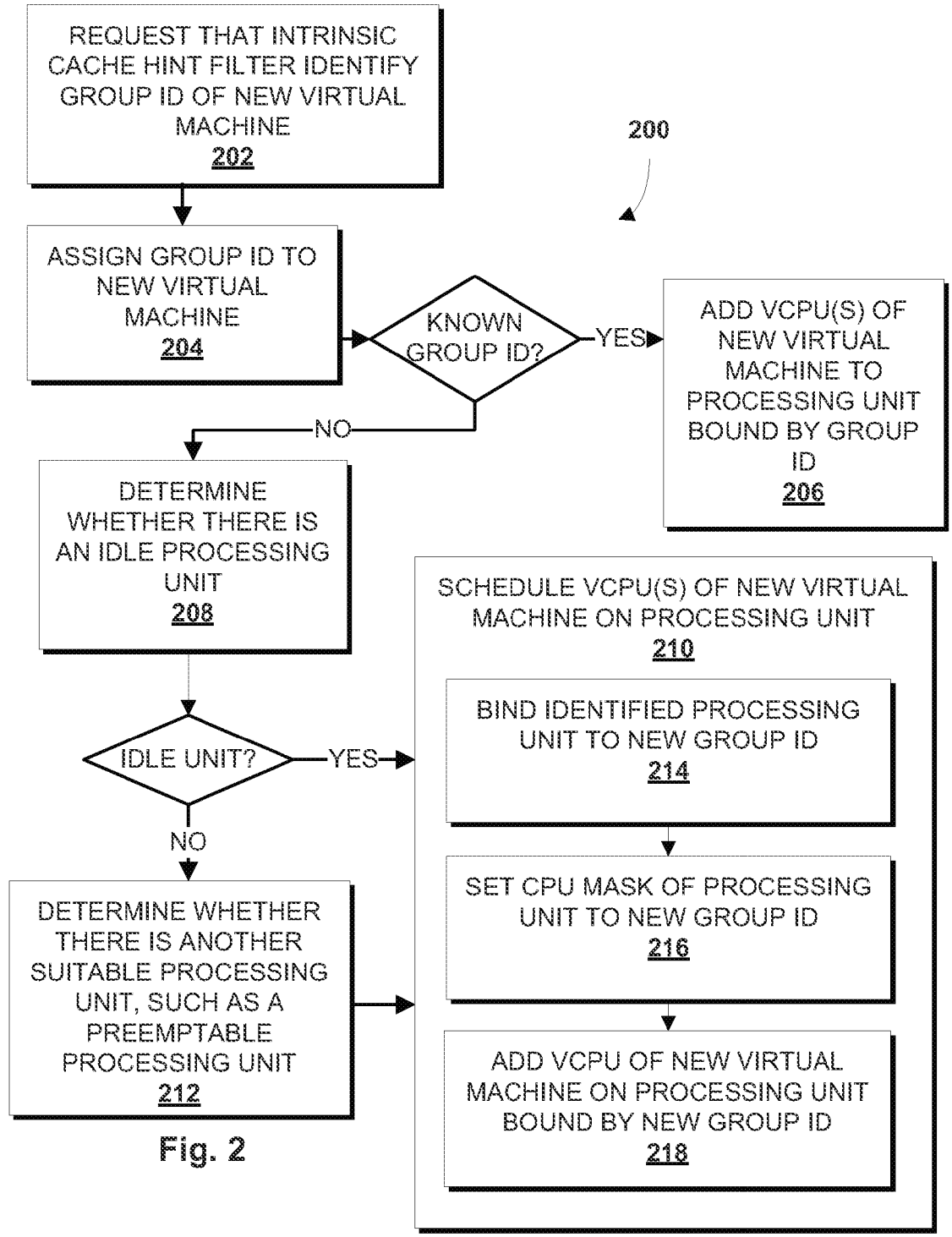
FIG. 2 schematically depicts an example method for scheduling a virtual central processing unit of a virtual machine on a physical processing unit of a plurality of physical processing units, in accordance with various embodiments.

An example method 200 that may be performed by a virtual machine monitor such as virtual machine monitor 104 to determine whether to schedule one or more virtual central processing units 100 of a virtual machine on a physical processing unit 102 is depicted in FIG. 2. At block 202, virtual machine monitor 104 and/or scheduler core 108 may request that intrinsic cache hint filter 112 identify a group of virtual machines to which the virtual machine will/should belong. Intrinsic cache hint filter 112 may utilize information it receives from various sources as described above, such as a template used to initiate the virtual machine, to determine an appropriate group of virtual machines. For example, intrinsic cache hint filter 112 may determine that the virtual machine was initiated using a Linux template. Accordingly, intrinsic cache hint filter 112 may assign the virtual machine a GROUP ID of a group of virtual machines initiated with templates of a particular operating system, such as Linux, Windows XP®, and so forth. If there is no such group, a new GROUP may be created, and a new GROUP ID may be assigned to the virtual machine at 204, e.g., by virtual machine monitor 104, scheduler core 108 or intrinsic cache hint filter 112. This new GROUP ID may be assigned to subsequent virtual machines initiated with a similar template.

If the GROUP ID assigned to the virtual machine is already known, then at block 206, virtual machine monitor 104 and/or scheduler core 108 may add the virtual central processing unit(s) of the virtual machine to a physical processing unit that is already bound to the GROUP ID If the virtual machine's GROUP ID is unknown, that may indicate that no physical processing unit 102 is currently operating virtual central processing units 100 of virtual machines with similar contexts as the virtual machine. Accordingly, at block 208, virtual machine monitor 104 and/or scheduler core 108 may determine whether there is an idle physical processing unit 102.

If there is an idle physical processing unit 102, then at block 210, the one or more virtual central processing units of new virtual machine may be scheduled, e.g., by virtual machine monitor 104 or scheduler core 108, on that physical processing unit 102. If there are no idle physical processing units 102, then at block 212, virtual machine monitor 104 and/or scheduler core 108 may identify another suitable physical processing unit 102, such as a preemptable physical processing unit, a physical processing unit operating a suitably low number of virtual central processing units 100 (e.g., the physical processing unit 102 of a plurality of physical processing units operating the fewest virtual central processing units 100), or another physical processing unit dictated by a scheduler policy. Virtual machine monitor 104 and/or scheduler core 108 may schedule the one or more virtual central processing units of the new virtual machine on the idle/preemptable or identified physical processing unit 102 at block 210.

Scheduling a virtual central processing unit of a virtual machine on a physical processing unit, as shown at block 210, may include various operations. At block 214, the identified physical processing unit may be bound, e.g., by virtual machine monitor 104 and/or scheduler core 108, to the new GROUP ID of the virtual machine. In some embodiments, at block 216, a CPU mask of the physical processing unit may be set to a cpumask of the GROUP ID. At block 218, one or more virtual central processing units of the virtual machine may be scheduled, e.g., by virtual machine monitor 104 and/or scheduler core 108, on the identified physical processing unit bound by the GROUP ID, and may inherit a CPU mask from the GROUP ID. Subsequent virtual machines of a similar context as the virtual machine also may be assigned the same GROUP ID. Thereafter, virtual central processing units of those subsequent virtual machines may be added, e.g., by virtual machine monitor 104 and/or scheduler core 108, on the same physical processing unit at block 206.

As mentioned above, a virtual machine may include multiple virtual central processing units, and a virtual machine monitor or scheduler core may schedule each virtual central processing unit independently. Where a virtual machine only uses one virtual central processing unit, scheduling the virtual central processing unit may be similar to scheduling the virtual machine itself. However, virtual central processing units may themselves be scheduled among so-called "sibling" physical processing units (multiple physical processing units that share cache) without reducing cache hit rates. For instance, assume that a first virtual machine includes two virtual central processing units (VCPU_A and VCPU_B) and a second virtual machine includes two virtual central processing units (VCPU_C and VCPU_D). VCPU_A and VCPU_B may have 100% context similarity since they can have same memory access (entire memory of first virtual machine). The same may be true for VCPU_C and VCPU_D.

Cache hints may include more complex information, such as per-virtual machine similarity. This may be usable not only to determine whether to schedule virtual machines, but to determine whether to schedule and/or migrate virtual central processing units of those virtual machines. For example, in environments where there is CPU over-commitment—that is, there may be more virtual central processing units than physical processing units—cache hints may include a per-virtual machine array, as shown in the following example:

| VM1 | |
|---|---|
| VM1→VM2 | 90% similar |
| VM1→VM3 | 10% similar |
| VM1→VM4 | 10% similar |
| VM2 | |
| VM2→VM1 | 90% similar |
| VM2→VM3 | 10% similar |
| VM2→VM4 | 10% similar |

With this more complex cache hint, scheduler core 108 may consider, in detail, effective migration of virtual central processing units of virtual machines, among physical processing units. As discussed above, the cache hint may not be the only deciding factor. Other factors may include but are not limited to priority, credit (in embodiments using a credit scheduler), and so forth.

Figure 3:
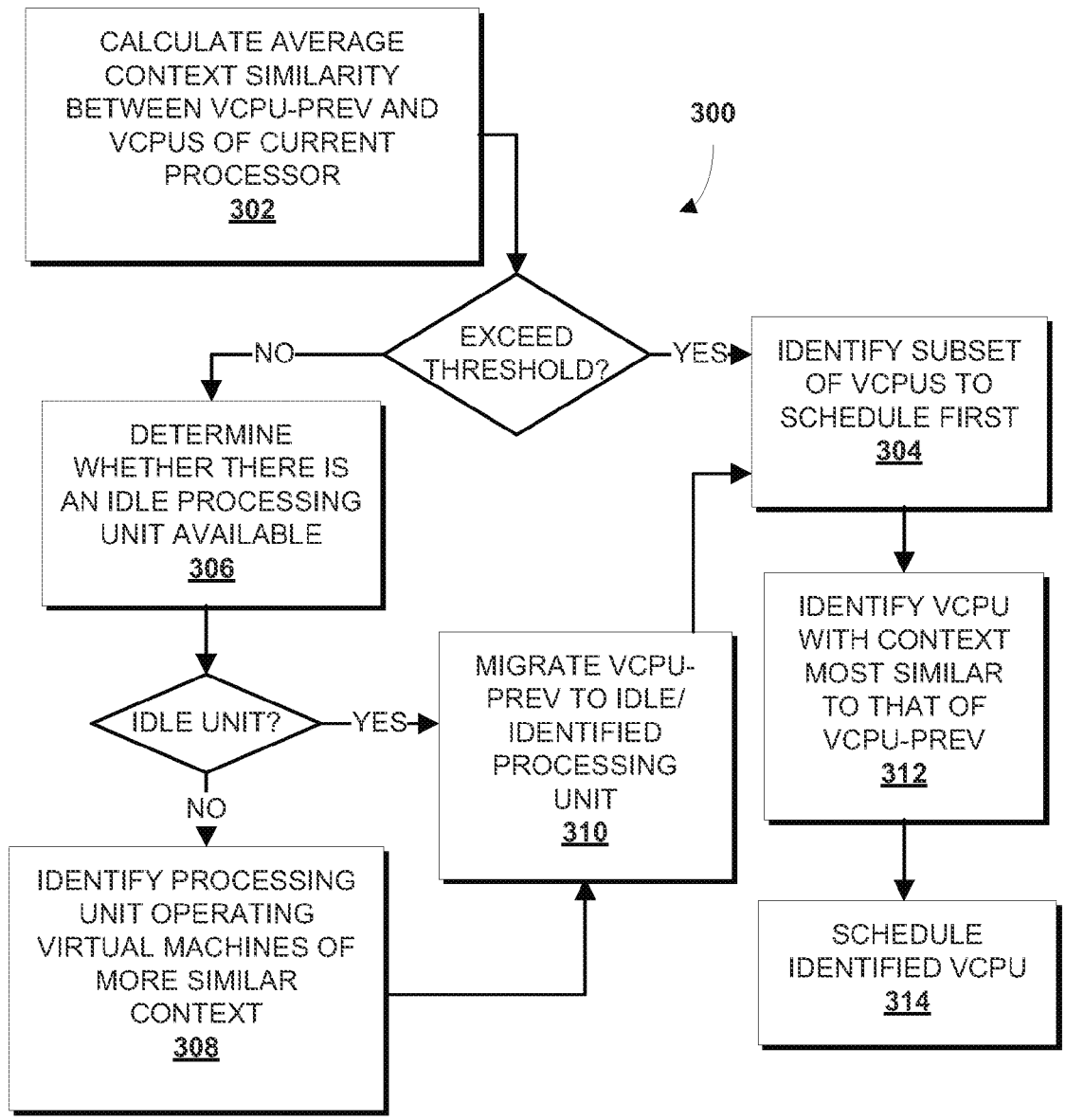
FIG. 3 schematically depicts an example method for migrating and/or scheduling one or more virtual central processing units of virtual machines among a plurality of physical processing units, in accordance with various embodiments.

An example method 300 that may be implemented, e.g., by virtual machine monitor 104 or scheduler core 108, in an environment with CPU over-commitment is shown in FIG. 3. As noted above, per-virtual machine cache hints may be one of a number of factors considered by virtual machine monitor 104 and/or scheduler core 108.

The contents of a physical processing unit's cache may be largely populated by existing virtual central processing units in the physical processing unit's run queue. In existing systems, the most recently-operated virtual central processing unit that is to be scheduled out may be placed at the tail of the run queue. However, this most recently operated virtual central processing unit, referred to herein as "VCPU-prev," may be more responsible for the contents of a physical processing unit's cache than other virtual central processing units in the run queue.

Accordingly, at block 302, when ready to schedule one or more virtual machines among a plurality of physical processing units, virtual machine monitor 104, scheduler core 108 and/or intrinsic cache hint filter 112 may first determine whether to migrate VCPU-prev to another physical processing unit. An average context similarity between a the virtual machine of which VCPU-prev is part and virtual machines of other virtual central processing units operated by the current physical processing unit may be calculated, e.g., by intrinsic cache hint filter 12. If the context similarity average is greater than a predetermined threshold, VCPU-prev may remain on the current physical processing unit and method 300 may proceed to block 304, which will be described below. However, if the similarity average is less than the predetermined threshold, then virtual machine monitor 104 and/or scheduler core 108 may consider whether to migrate VCPU-prev to another physical processing unit.

For example, at block 306, virtual machine monitor 104 and/or scheduler core 108 may determine whether there is an idle physical processing unit available. If so, then virtual machine monitor 104 and/or scheduler core 108 may migrate VCPU-prev to the idle physical processing unit at 310 and proceed to block 304. If not, then at block 308, virtual machine monitor 104 and/or scheduler core 108 may identify another physical processing unit operating virtual central processing units of virtual machines with more similar contexts to VCPU-prev's virtual machine than those operated by the current physical processing unit. Then, at block 310, virtual machine monitor 104 and/or scheduler core 108 may migrate VCPU-prev to the identified physical processing unit and proceed to block 304.

Whether VCPU-prev was migrated or not, at block 304, virtual machine monitor 104 and/or scheduler core 108 may identify, from virtual central processing units of the current processor, a subset of virtual central processing units that may be scheduled first. For example, in some embodiments, one or more virtual central processing units with the highest priority may be identified. In some embodiments, one or more virtual central processing units that are ready to be executed but have been delayed (e.g., preempted by other virtual central processing units) may be identified. In some embodiments, all the one or more virtual central processing units may be identified.

At block 312, a virtual central processing unit of the subset of virtual central processing units identified at block 304, whose virtual machine has the most similar context to VCPU-prev's virtual machine, may be identified. At block 314, the identified virtual central processing unit of the subset may be scheduled to operate on the same physical processing unit as VCPU-prev.

Figure 4:
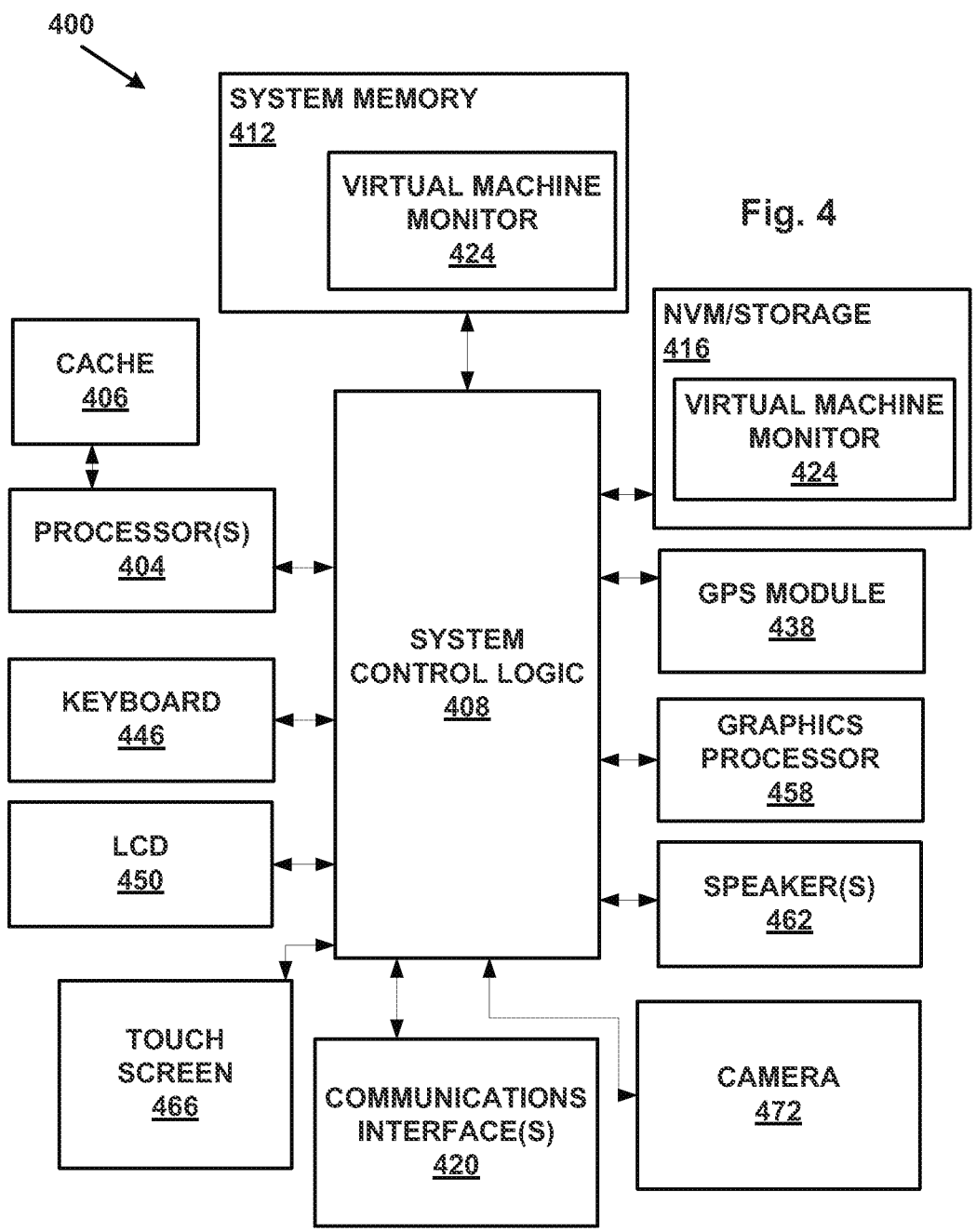
FIG. 4 schematically depicts an example system on which various disclosed methods may be implemented, in accordance with various embodiments.

The techniques and apparatuses described herein may be implemented into a system using suitable hardware and/or software to configure as desired. FIG. 4 illustrates, for one embodiment, an example system control logic 408 coupled to at least one of the processor(s) 404 with cache 406, system memory 412 coupled to system control logic 408, non-volatile memory (NVM)/storage 416 coupled to system control logic 408, and one or more communications interface(s) 420 coupled to system control logic 408.

System control logic 408 for one embodiment may include any suitable interface controllers to provide for any suitable interface to at least one of the processor(s) 404 and/or to any suitable device or component in communication with system control logic 408.

System control logic 408 for one embodiment may include one or more memory controller(s) to provide an interface to system memory 412. System memory 412 may be used to load and store data and/or instructions, for example, for system 400. System memory 412 for one embodiment may include any suitable volatile memory, such as suitable dynamic random access memory ("DRAM"), for example.

System control logic 408 for one embodiment may include one or more input/output ("I/O") controller(s) to provide an interface to NVM/storage 416 and communications interface(s) 420.

NVM/storage 416 may be used to store data and/or instructions, for example. NVM/storage 416 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s) for example.

The NVM/storage 416 may include a storage resource physically part of a device on which the system 400 is installed or it may be accessible by, but not necessarily a part of, the device. For example, the NVM/storage 416 may be accessed over a network via the communications interface(s) 420.

System memory 412 and NVM storage 416 may include, in particular, temporal and persistent copies of a virtual machine monitor 424, respectively. The virtual machine monitor 424 may include instructions that when executed by at least one of the processor(s) 404 result in the system 400 scheduling virtual central processing units of virtual machines among a plurality of physical processing units, as described above. In some embodiments, the virtual machine monitor 424 may additionally/alternatively be located in the system control logic 408.

Communications interface(s) 420 may provide an interface for system 400 to communicate over one or more network(s) and/or with any other suitable device. Communications interface(s) 420 may include any suitable hardware and/or firmware, such as a network adapter.

For one embodiment, at least one of the processor(s) 404 may be packaged together with virtual machine monitor 424 or system control logic 408 with virtual machine monitor 424. For one embodiment, at least one of the processor(s) 404 may be packaged together with virtual machine monitor 424 or system control logic 408 with virtual machine monitor 424 to form a System in Package ("SiP"). For one embodiment, at least one of the processor(s) 404 may be integrated on the same die with virtual machine monitor 424 or system control logic 408 with virtual machine monitor 424. For one embodiment, at least one of the processor(s) 404 may be integrated on the same die with virtual machine monitor 424 or system control logic 408 with virtual machine monitor 424 to form a System on Chip ("SoC").

The system 400 may be a desktop or laptop computer, a server computer system, a mobile telephone, a smart phone, a tablet, a set top box, a game console, or any other device adapted to manage virtual machines. In various embodiments, system 400 may have more or less components, and/or different architectures. For example, in FIG. 4, system 400 includes a global positioning system ("GPS") module 438, a keyboard 446, a liquid crystal display ("LCD") 450, a graphics processor 458, speakers 462, a touch screen 466 (which in some cases may be the same as LCD 450), and a camera 472 that may be operated by processor(s) 404 to capture images for storage in NVM/storage 416.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. At least one non-transitory computer-readable storage medium having stored therein a plurality of instructions that, when executed by an apparatus, provide the apparatus with a virtual machine monitor to:
cause the activation of a performing monitoring unit from a deactivated state when a count of acts of scheduling of one or more virtual central processing units on one or more physical processing units during a predetermined time interval exceeds a predetermined threshold, wherein:
the performance monitoring unit is coupled to a plurality of physical processing units of the apparatus,
one or more cache units are each associated with one or more of the physical processing units, and
the performing monitoring unit, when activated, samples data from the one or more physical processing units to enable the determination of cache hit rate on the one or more associated cache units;
determine, based on information provided by the performance monitoring unit, whether to schedule a virtual central processing unit of a virtual machine on a first physical processing unit of the plurality of physical processing units, wherein the virtual machine has one or more virtual central processing units, and wherein the determination is based at least in part on whether a context of the virtual central processing unit suggests a desired cache hit rate on one or more cache units associated with the first physical processing unit when operating the virtual central processing unit.

2. The at least one non-transitory computer-readable storage medium of claim 1, wherein the context of the virtual central processing unit includes one or more memory pages accessed by the first physical processing unit when operating the virtual central processing unit.

3. The at least one non-transitory computer-readable storage medium of claim 1, wherein the context of the virtual central processing unit includes a template used to initiate the virtual machine.

4. The at least one non-transitory computer-readable storage medium of claim 1, further having stored therein a plurality of instructions that, when executed by the apparatus, provide the apparatus with the virtual machine monitor to determine whether to schedule the virtual central processing unit on the first physical processing unit based on page sharing statistics of a plurality of virtual machines.

5. The at least one non-transitory computer-readable storage medium of claim 4, wherein the page sharing statistics include a page sharing ratio.

6. The at least one non-transitory computer-readable storage medium of claim 1, wherein the first physical processing unit is a host of a cloud computing system.

7. The at least one non-transitory computer-readable storage medium of claim 1, wherein the first physical processing unit comprises one or more microprocessor cores sharing a cache.

8. The at least one non-transitory computer-readable storage medium of claim 1, wherein the first physical processing unit comprises one or more logical processors of a hyper-threading processor.

9. The at least one non-transitory computer-readable storage medium of claim 1, further having stored therein a plurality of instructions that, when executed by the apparatus, provide the apparatus with the virtual machine monitor to periodically activate the performance monitoring unit at predetermined time intervals.

10. The at least one non-transitory computer-readable storage medium of claim 1, further having stored therein a plurality of instructions that, when executed by the apparatus, provide the apparatus with the virtual machine monitor to deactivate the performance monitoring unit when the count falls below the predetermined threshold.

11. The at least one non-transitory computer-readable storage medium of claim 1, wherein the performance monitoring unit comprises a set of performance monitoring unit hardware per physical processing unit.

12. A system, comprising:
a plurality of physical processing units;
one or more cache units each associated with one or more physical processing units of the plurality of physical processing units;
a performance monitoring unit coupled to the plurality of physical processing units; and
a virtual machine monitor operable by one of the physical processing units;
wherein the virtual machine monitor is to:
schedule one or more virtual central processing units on one or more of the plurality of physical processing units;
cause the activation of the performance monitoring unit from a deactivated state when a count of acts of scheduling of the one or more virtual central processing units on one or more physical processing units during a predetermined time interval exceeds a predetermined threshold, wherein the performance monitoring unit, when activated, samples data from the one or more physical processing units to enable the determination of cache hit rate on the one or more associated cache units; and
determine, based on information provided by the performance monitoring unit, whether to schedule a virtual central processing unit of a virtual machine on a first of the plurality of physical processing units, wherein each the virtual machine has one or more virtual central processing units, and wherein the determination is based at least in part on whether a context of the virtual central processing unit suggests a desired cache hit rate on one or more cache units associated with the first physical processing unit when operating the virtual central processing unit.

13. The system of claim 12, further comprising an intrinsic cache hint filter to be operated by one of the physical processing units to receive information about the context of the virtual central processing unit, wherein the virtual machine monitor determines whether to schedule the virtual central processing unit on the first physical processing unit based at least in part on the received information.

14. The system of claim 13, wherein the information about the context of the virtual central processing unit received by the intrinsic cache hint filter includes a template used to initiate the virtual machines.

15. The system of claim 13, wherein the information about the context of the virtual central processing unit received by the intrinsic cache hint filter includes one or more memory pages accessed by the first physical processing unit when operating the virtual central processing unit.

16. The system of claim 12, wherein the virtual machine monitor is further configured to determine whether to schedule the virtual central processing unit on the first physical processing unit based on measured cache hit rate of the first physical processing unit.

17. The system of claim 12, further comprising a page sharing agent to be operated by one of the physical processing units to compile page sharing statistics of the plurality of virtual machines, wherein the virtual machine monitor is further to determine whether to schedule the virtual central processing unit on the first physical processing unit based on the compiled page sharing statistics.

18. The system of claim 17, wherein the compiled page sharing statistics include a page sharing ratio.

19. The system of claim 12, wherein the virtual machine monitor is further to periodically activate the performance monitoring unit at predetermined time intervals.

20. The system of claim 12, wherein the virtual machine monitor is further to deactivate the performance monitoring unit when the count of acts of scheduling of the one or more virtual central processing units by the virtual machine monitor during a predetermined time interval falls below the predetermined threshold.

21. The system of claim 12, further comprising a camera operable by one of the processing units to capture image data for storage in a memory.

22. The system of claim 12, wherein the performance monitoring unit comprises a set of performance monitoring unit hardware per physical processing unit.

23. A method, comprising:
receiving, by a virtual machine monitor, context information about a plurality of virtual machines operated by a plurality of physical processing units in an apparatus, wherein the apparatus includes one or more cache units each associated with one or more physical processing units of the plurality of physical processing units, and each virtual machine has one or more virtual central processing units;
cause the activation of a performance monitoring unit, by the virtual machine monitor, from a deactivated state when a count of acts of scheduling of the one or more virtual central processing units on one or more physical processing units during a predetermined interval exceeds a predetermined threshold, wherein:
the performance monitoring unit is coupled to the plurality of physical processing units, and
the performance monitoring unit, when activated, samples data from the one or more physical processing units to enable the determination of cache hit rate on the one or more associated cache units;
determining, by the virtual machine monitor based at least in part on information provided by the performance monitoring unit, whether to schedule a virtual central processing unit of a virtual machine on a first of the plurality of physical processing units, wherein the determination is based at least in part on whether the received context information suggests a desired cache hit rate on one or more cache units associated with the first physical processing unit when operating the virtual central processing unit.

24. The method of claim 23, further comprising:
monitoring, by the virtual machine monitor, a cache hit rate on the one or more cache units by the first physical processing unit; and
determining, by the virtual machine monitor, whether to schedule the virtual central processing unit to the first physical processing unit based at least in part on the monitored cache hit rate.

25. The method of claim 23, wherein the performance monitoring unit comprises a set of performance monitoring unit hardware per physical processing unit.

* * * * *